(12) United States Patent
Tian et al.

(10) Patent No.: US 10,386,548 B2
(45) Date of Patent: Aug. 20, 2019

(54) DIFFUSE REFLECTION MATERIAL, DIFFUSE REFLECTION LAYER, WAVELENGTH CONVERSION DEVICE AND LIGHT SOURCE SYSTEM

(71) Applicant: Appotronics Corporation Limited, Shenzhen (CN)

(72) Inventors: Zifeng Tian, Shenzhen (CN); Hu Xu, Shenzhen (CN); Qian Li, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 250 days.

(21) Appl. No.: 15/534,940

(22) PCT Filed: Dec. 2, 2015

(86) PCT No.: PCT/CN2015/096219
§ 371 (c)(1),
(2) Date: Jun. 9, 2017

(87) PCT Pub. No.: WO2016/091107
PCT Pub. Date: Jun. 16, 2016

(65) Prior Publication Data
US 2017/0322349 A1    Nov. 9, 2017

(30) Foreign Application Priority Data
Dec. 11, 2014    (CN) .......................... 2014 1 0766308

(51) Int. Cl.
*G02B 5/02*    (2006.01)
*C09K 5/14*    (2006.01)
(Continued)

(52) U.S. Cl.
CPC .............. *G02B 5/0242* (2013.01); *C03C 8/16* (2013.01); *C03C 8/20* (2013.01); *C03C 14/004* (2013.01);
(Continued)

(58) Field of Classification Search
CPC ........... G02B 5/0242; C03C 8/20; C03C 8/16; C09K 5/14; C04B 41/86; C04B 41/5022; F21V 9/16
See application file for complete search history.

(56) References Cited

FOREIGN PATENT DOCUMENTS

| CN | 1632614 A | 6/2005 |
|----|-----------|--------|
| CN | 1640948 A | 7/2005 |

(Continued)

OTHER PUBLICATIONS

International Search Report, dated Feb. 16, 2016, for International Application No. PCT/CN2015/096219, 2 pages.

*Primary Examiner* — Joseph L Williams
(74) *Attorney, Agent, or Firm* — Seed Intellectual Property Law Group LLP

(57) ABSTRACT

A diffuse reflection material, a diffuse reflection layer, a wavelength conversion device, and a light source system are disclosed. The diffuse reflection material includes white scattering particles and an adhesive agent, where the whiteness of the white scattering particles is greater than 85, and the white scattering particles contain high reflection scattering particles with a whiteness of greater than 90, high refraction scattering particles with a refractive index of greater than or equal to 2.0, and high thermal conductivity scattering particles, where the high thermal conductivity scattering particles are boron nitride and/or aluminum nitride particles, and the particle shape of the high thermal conductivity scattering particles is rod-like or flat. The reduction in the thickness of the diffuse reflection layer is realized while (Continued)

keeping a high reflectivity, thus causing the wavelength conversion device to have both a high light efficiency and high heat stability.

20 Claims, 1 Drawing Sheet

(51) Int. Cl.
  *C03C 14/00* (2006.01)
  *G02B 1/00* (2006.01)
  *F21V 9/30* (2018.01)
  *C03C 8/16* (2006.01)
  *C03C 8/20* (2006.01)
  *C04B 41/50* (2006.01)
  *C04B 41/86* (2006.01)

(52) U.S. Cl.
  CPC .......... *C04B 41/5022* (2013.01); *C04B 41/86* (2013.01); *C09K 5/14* (2013.01); *F21V 9/30* (2018.02); *G02B 1/00* (2013.01); *C03C 2209/00* (2013.01); *C03C 2214/04* (2013.01)

(56) References Cited

FOREIGN PATENT DOCUMENTS

| | | |
|---|---|---|
| CN | 101088961 A | 12/2007 |
| CN | 103102668 A | 5/2013 |

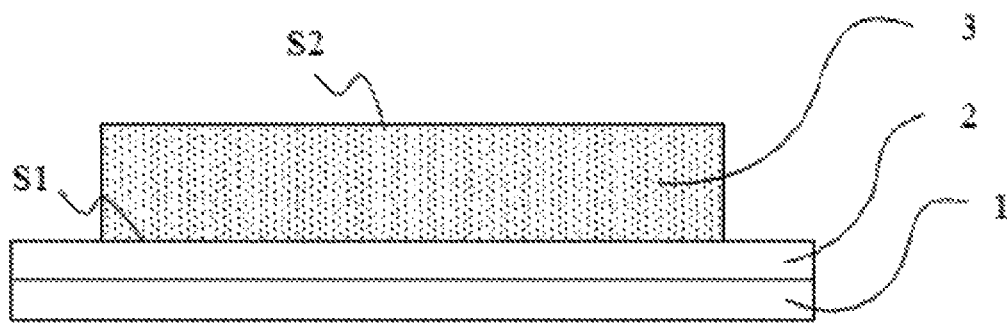

DIFFUSE REFLECTION MATERIAL, DIFFUSE REFLECTION LAYER, WAVELENGTH CONVERSION DEVICE AND LIGHT SOURCE SYSTEM

BACKGROUND

Technical Field

The present disclosure relates to the field of optical energy sources, and in particular to a diffuse reflection material, diffuse reflection layer, a wavelength conversion device and a light source system.

Description of the Related Art

At present, the excitation of a high speed color wheel by blue light laser can effectively solve the heat quenching problem with a phosphor powder to realize a high-efficiency and low-cost laser display, and has gradually developed into one of the mainstream technologies of laser light sources. In this solution, the light sources include an excitation source and a wavelength conversion device, where the wavelength conversion device includes a reflective substrate and a phosphor powder sheet coated onto the reflective substrate, as well as a motor for driving rotation of the reflective substrate, to allow light spots formed on the phosphor powder sheet by exciting light from the excitation source to act on the phosphor powder sheet according to a round path.

Mirror aluminum is employed as the reflective substrate in an existing wavelength conversion device. High purity aluminum or high purity silver is employed as the high reflection layer in such mirror aluminum. With the increase in the light source power of lasers, mirror silver/aluminum suffers from an increasingly severe problem of nigrescence due to oxidation at a high temperature. In order to solve this problem, a diffuse reflection layer formed by white diffuse reflection particles adhered by an adhesive agent, or a porous reflective ceramic is generally employed in place of the silver/aluminum plated metallic reflection layer, so as to avoid, to a certain extent, the problem of decrease in the reflective index of the reflective layer at high temperature.

However, the reflection mechanism of such diffuse reflection layer is multiple scattering-reflection generation of specific light wave by the scattering particles. In order to achieve a higher diffuse reflective index in the diffuse reflection layer, the film layer thereof must achieve a greater thickness, and generally a thickness of 200 μm or more. However, with respect to a thickness of hundreds of nanometer of the medium protection layer of a mirror silver surface, such film thickness will increase the conduction paths of heat generated by the fluorescent layer, thereby leading to a higher thermal resistance, which is adverse to luminous thermostability of the wavelength conversion device. How to take account of both luminous efficiency and thermostability of a wavelength conversion device has become a new issue for the research and development personnel.

At present, a higher reflective index can be realized at a lower thickness by employing high reflection particles sub-micrometer-sized aluminum oxide and adjuvant particles titanium dioxide with a strong covering power. However, wavelength conversion devices formed by this material lack in luminous stability when excited with a laser at a high power density. Therefore, there is still a need for modifications in the existing wavelength conversion devices, so as to improve the luminous efficiency and thermostability thereof.

BRIEF SUMMARY

The present disclosure provides a diffuse reflection material, a diffuse reflection layer, a wavelength conversion device and a light source system, to improve the reflective index of a diffuse reflection material and improve the thermostability of a wavelength conversion device.

In various aspects, the present disclosure provides a diffuse reflection material, including white scattering particles and an adhesive agent, where the white scattering particles have a whiteness greater than 85, and the white scattering particles include high reflection scattering particles with a whiteness greater than 90, high refraction scattering particles with a refractive index greater than or equal to 2.0 and high thermal conductivity scattering particles, where the high thermal conductivity scattering particles are boron nitride and/or aluminum nitride and have a rod-like or flat particle shape.

The flat shape includes a sheet, plate or strip shape, and it is preferably sheet-shaped.

Further, the white scattering particles include, based on parts by weight, 0.08 part to 0.15 part of high reflection scattering particles with a whiteness greater than 90, 0.5 part to 0.7 part of high refraction scattering particles, and 0.3 part to 0.5 part of high thermal conductivity scattering particles.

Further, a ratio by weight of the white scattering particles to the adhesive agent is from 0.88 to 1.15:1.

Further, the high reflection scattering particles with a whiteness greater than 90 and the high refraction scattering particles are spherical in shape. Preferably the high reflection scattering particles with a whiteness greater than 90 and the high refraction scattering particles have a radius from 0.2 μm to 0.5 μm.

Further, the high reflection scattering particles with a whiteness greater than 90 are one or more of aluminum oxide, magnesium oxide and barium sulfate; the high refraction scattering particles are one or more of titanium dioxide, zirconium oxide and zinc oxide; when the high thermal conductivity scattering particles are flat, the high thermal conductivity scattering particles have a length in the flat direction of 0.7 μm to 7 μm and a length in the thickness direction of 0.02 μm to 0.25 μm; and when the high thermal conductivity scattering particles are rod-like, the high thermal conductivity scattering particles have a length in the length direction of 0.7 μm to 7 μm and a diameter in the peripheral direction of 0.02 μm to 0.25 μm.

According to another aspect of the present disclosure, there is provided a diffuse reflection layer prepared from any of the above diffuse reflection materials.

According to yet another aspect of the present disclosure, there is provided a method for preparing a diffuse reflection layer, the preparation method including the following steps of mixing any of the above diffuse reflection materials with an organic carrier to form a mixed material, and coating the mixed material onto a substrate surface and sintering to form the diffuse reflection layer.

Further, in the step of coating the mixed material onto a substrate surface, the coating is carried out in a manner of blade coating, spin coating or screen printing.

Further, the step of coating the mixed material onto a substrate surface and sintering to form the diffuse reflection layer includes coating the mixed material onto a substrate surface and sintering to form a first sub-diffuse reflection layer, coating the mixed material onto a surface of the first sub-diffuse reflection layer and sintering to form a second sub-diffuse reflection layer, and repeating the coating and sintering steps, to form a plurality of sub-diffuse reflection layers, thereby to form the diffuse reflection layer.

According to one aspect of the present disclosure, there is provided a wavelength conversion device, including a high thermal conductivity substrate, a fluorescent layer provided on the high thermal conductivity substrate, and a diffuse reflection layer located between the high thermal conductivity substrate and the fluorescent layer, where the diffuse reflection layer is any of the above diffuse reflection layers.

Further, the diffuse reflection layer has a thickness of 30 µm to 100 µm, and a reflective index higher than 90%.

According to another aspect of the present disclosure, there is provided a light source system, including a wavelength conversion device, where the wavelength conversion device is the above wavelength conversion device.

Technical solutions according to the present disclosure include, but are not limited to a diffuse reflection material, a diffuse reflection layer, a wavelength conversion device and a light source system. With high reflection scattering particles with a whiteness greater than 90, high refraction scattering particles and high thermal conductivity scattering particles as raw materials, through the synergistic action among the three raw materials, by taking advantage of the effect of thinning a reflective layer mainly by the high refraction scattering particles and taking advantage of enhancement of the heat conduction effect in the diffuse reflection layer by the high thermal conductivity scattering particles, the diffuse reflective index of the diffuse reflection layer is maintained while in favor of reduction in the thickness of the diffuse reflection layer, thereby to take account of both luminous efficiency and thermostability of the wavelength conversion device, and improve the luminous stability of the wavelength conversion device when excited with a high power laser.

BRIEF DESCRIPTION OF THE SEVERAL VIEWS OF THE DRAWINGS

Accompanying drawings of the description constituting a portion of the present application serve to provide further understanding of the present disclosure. Exemplary examples of the present disclosure and description thereof are used to explain the present disclosure, and do not constitute improper limitation to the present disclosure. In the accompanying drawings:

FIG. 1 shows a structural representation of a wavelength conversion device in one typical embodiment according to the present disclosure.

DETAILED DESCRIPTION

As a preliminary consideration, it should be understood that examples and features described herein can be combined with each other as long as no contradiction is caused. The present disclosure will be described in detail below referring to the accompanying drawings in combination with examples.

In the present disclosure, the term "whiteness" refers to the degree to which a surface is white, and is expressed by a percentage of the white content. Typically, magnesium oxide is used as the standard whiteness 100, and is defined as the standard reflective index 100%. Blue-light whiteness of a sample is represented by a percentage of reflective index on a surface of a magnesium oxide standard plate irradiated with blue light. Three numerical values are obtained through measurement by using red, green, and blue color filters or three light sources, and averaged to obtain a trichroic whiteness in which the measurement is carried out by an optoelectronic whiteness meter.

In the present disclosure, the term "refractive index" refers to a ratio of the light speed in vacuo to the light speed in the material, and is obtained by testing with a minimum deviation angle method.

In the present disclosure, the term "reflective index" refers to the reflectivity of an object—light interface towards the incident ray, and is referred to as mineral reflectivity. The reflective index is obtained by a test in which the diffuse reflection luminous power of the sample is subjected to comparison tests using an integrating sphere, with a barium sulfate diffuse reflection whiteboard as a standard.

In the present disclosure, the "flat shape" includes common shapes such as a sheet, a strip or a plate shape.

As pointed out in the Background, the prior art suffers from a technical problem of having difficulty taking into account both luminous efficiency and thermostability of a wavelength conversion device. In order to improve this problem, the present disclosure provides a diffuse reflection material. This diffuse reflection material includes white scattering particles and an adhesive agent, where the white scattering particles have a whiteness greater than 85, and includes high reflection scattering particles with a whiteness greater than 90, high refraction scattering particles with a refractive index greater than or equal to 2.0 and high thermal conductivity scattering particles, where the high thermal conductivity scattering particles are boron nitride and/or aluminum nitride and have a rod-like or flat particle shape.

In the process of practical operation of a diffuse reflection layer prepared using the above diffuse reflection material, when photons of the visible light are passing through the white scattering particles, a portion of the light is directly reflected by the reflection particles with a reflection function back to the interface, and the other portion of the light further scatters and refracts forward under the action of refraction particles with a refraction function and thermally conductive particles with a heat conduction function. After passage of a stretch of the optical length, the light finally comes back to the interface after multiple refraction-reflection. The length of this stretch of optical length is related to the refractive index, and generally, a higher refractive index with respect to the medium leads to a shorter optical length, and a shorter optical length leads to reduced probability of being absorbed and a higher reflective index. Therefore, under circumstances in which the same reflective index is achieved, a diffuse reflection layer comprising refraction particles with a higher refractive index has a lower thickness, and a thinner diffuse reflection layer is in favor of reduction in the thermal resistance thereof, and improvement in the stability of the wavelength conversion device when excited with a high power laser. In the present disclosure, preferably high refraction scattering particles with a refractive index of 2.0 or more are employed. Preferably, the above high refraction scattering particles include, but are not limited to, one or more of titanium dioxide, zirconium oxide and zinc oxide.

Further, in the diffuse reflection layer prepared from the above diffuse reflection material, photons of the long wavelength red light in the visible light region have a stronger forward scattering capacity, and thus under the same circumstance, the optical length of refraction-reflection light paths in the diffuse reflection layer thereof is greater than those of photons of the green light and blue light. Therefore, the addition of reflection particles with a relatively higher refractive index is in favor of attenuation of the problem that the white scattering particles have a lower reflective index towards photons of the red light, thereby to improve the reflective index towards the whole visible region by the diffuse reflection layer. In the present disclosure, preferably high reflection scattering particles with a whiteness greater than 90 are employed. Preferably, the above high reflection scattering particles with a whiteness greater than 90 include, but are not limited to, one or more of aluminum oxide, magnesium oxide and barium sulfate, and a diffuse emission layer prepared from the above particles has a high reflective index, which can be greater than 90%.

Furthermore, in the diffuse reflection layer prepared from the above diffuse reflection material, thermally conductive particles with a heat conduction function mainly function to enhance conduction of the diffuse reflection layer. A better heat-conducting property of the thermally conductive particles is more beneficial for transfer of the heat generated in the light reflection process. In the present disclosure, preferably high thermal conductivity scattering particles are employed. Preferably, the above high thermal conductivity scattering particles are boron nitride and/or aluminum nitride particles. The particle shape of the high thermal conductivity scattering particles are set as rod-like or flat, to further improve the contact area among the scattering particles and form thermally conductive networks, so as to contribute to the improvement in heat diffusivity of the diffuse reflection layer, thereby contributing to the improvement in the luminous thermostability of the wavelength conversion device having the above diffuse reflection layer when excited with a high power laser.

In addition, whiteness of the above high reflection scattering particles with a whiteness greater than 90, high refraction scattering particles and the high thermal conductivity scattering particles is controlled all at 85 or more, to contribute to the reduction in absorptivity of photons in the visible region by the scattering particles, thereby to optimize light emitting properties of a wavelength conversion plant comprising the diffuse reflection layer prepared from the above material.

In the above diffuse reflection material according to the present disclosure, high reflection scattering particles, high refraction scattering particles and high thermal conductivity scattering particles, which are all white and have a whiteness greater than 90, are allowed to have synergistic action, where the effect of thinning a reflective layer mainly by the high refraction scattering particles with a high refraction function is taken advantage of, and the effect of enhancing heat conduction of a diffuse reflection layer mainly by the high thermal conductivity scattering particles with a high heat conduction function is taken advantage of. The particle shape of the high thermal conductivity scattering particles is set as rod-like or flat to form thermally conductive networks, so as to improve heat diffusivity of the diffuse reflection layer, thereby contributing to the improvement in the luminous thermostability of the wavelength conversion device when excited with a high power laser. Thereby maintenance of the diffuse reflective index of the diffuse reflection layer is contributed under a circumstance in which the thickness of a diffuse reflection layer is reduced, thereby to take account of both luminous efficiency and thermostability of the wavelength conversion device, and improve the luminous stability of the wavelength conversion device when excited with a high power laser.

In the above diffuse reflection material according to the present disclosure, as long as the high reflection scattering particles with a whiteness greater than 90, the high refraction scattering particles and the high thermal conductivity scattering particles are included at the same time, the diffuse reflective index of a diffuse reflection layer can be maintained while the thickness of the diffuse reflection layer is reduced. In a preferred embodiment of the present disclosure, the above scattering particles include, based on parts by weight, 0.08 part to 0.15 part of high reflection scattering particles with a whiteness greater than 90, 0.5 part to 0.7 part of high refraction scattering particles, and 0.3 part to 0.5 part of high thermal conductivity scattering particles. In a preferred diffuse reflection material as described above, a ratio by weight of the white scattering particles to the adhesive agent is from 0.88 to 1.15:1. A mixture of the above scattering particles according to the above mixing ratio can better coordinate the reflection, refraction and heat conduction functions of the white scattering particles, thereby to better take account of both luminous efficiency and thermostability of the wavelength conversion device, and improve luminous stability of the wavelength conversion device when excited with a high power laser.

The adhesive agent that may be used in the present disclosure is an inorganic adhesive agent, which preferably includes, but is not limited to, glass powder, water glass or glass glaze materials, and more preferably borosilicate glass. The use of the above material as an adhesive agent has advantages of good heat resistance. When borosilicate glass is used as the adhesive agent, the structural strength is high and the heat-conducting property is relatively better. In a more preferred example according to the present disclosure, the above adhesive agent is a borosilicate glass with a $B_2O_3$ percentage content by mass from 10% to 20%, and a silicon oxide percentage content by mass from 70% to 90%, and borosilicate glass having the above content ranges has better thermal shock resistance.

In the above diffuse reflection material according to the present disclosure, the above high thermal conductivity scattering particles are preferably flat or rod-like. The flat or rod-like thermally conductive particles have a length in the flat direction far greater than that in the thickness direction thereof, or have a length in the length direction far greater than the diameter length in the peripheral direction thereof, so that the contact area among the various thermally conductive particles is larger, which is beneficial for the increase in the contact area among the scattering particles and the better formation of thermally conductive networks. More preferably, when the high thermal conductivity scattering particles are flat, the high thermal conductivity scattering particles have a length in the flat direction of 0.7 µm to 7 µm and a length in the thickness direction of 0.02 µm to 0.25 µm; and when the high thermal conductivity scattering particles are rod-like, the high thermal conductivity scattering particles have a length in the length direction of 0.7 µm to 7 µm and a diameter length in the peripheral direction of 0.02 µm to 0.25 µm. The lengths in the above directions of the above high thermal conductivity scattering particles employed in the present disclosure are not limited to the above ranges. However, when the above high thermal conductivity particles have lengths in the above directions exceeding the above ranges, it will be difficult to form a thinner reflective layer while maintaining higher thermal conductivity. The setting of the above high thermal conductivity scattering particles within the above ranges according to different shapes thereof can bring about both features of contribution to coating and higher thermal conductivity.

Preferably, the above high reflection scattering particles with a whiteness greater than 90 and high refraction scattering particles are preferably spherical in shape. The selection of spherical scattering particles is beneficial for the improvement in flowability of a glass powder in the molten state, and further, because the spherical scattering particles have a relatively identical curvature radius in various directions, the sintering stress in various directions is close in magnitude to that of the glass powder, to easily improve the adhesion strength after sintering, thereby to improve sintered density of the scattering particles. Preferably, the high reflection scattering particles with a whiteness greater than 90 and the high refraction scattering particles have a radius of 0.2 µm to 0.5 µm. White scattering particles in this region have the highest reflective index towards the visible region, which is beneficial for improvement in luminous properties of a wavelength conversion device comprising a diffuse reflection layer prepared from the above material.

More preferably, in the above diffuse reflection material, the high reflection scattering particles with a whiteness greater than 90 and the high refraction scattering particles are spherical in shape, the high thermal conductivity scattering particles are sheet-shaped, and a proportion by mass of the spherical particles to the sheet-shaped particles is not greater than 2.25:1. A ratio of the spherical particles to the sheet-shaped particles is controlled, to contribute to the adjustment of dosages of both, thereby to obtain a better heat dissipation effect. Further preferably, in the above diffuse reflection material, the high reflection scattering particles with a whiteness greater than 90 are aluminum oxide, the high refraction scattering particles are titanium dioxide, and the high thermal conductivity scattering particles are boron nitride. Titanium dioxide has a higher refractive index and can shorten the optical lengths of scattering and refraction light paths and reduce absorption, and thus can realize a higher reflective index at a lower thickness, which lower thickness further reduces the thermal resistance. Therefore, a composite diffuse reflection layer of sheet-shaped boron nitride, spherical aluminum oxide and titanium dioxide can realize a higher reflective index and a lower thermal resistance at a lower thickness, thereby contributing to the luminous efficiency and stability of the whole wavelength conversion device when excited with a laser at a high power density.

At the same time, the present disclosure further provides a diffuse reflection layer, prepared from the above diffuse reflection material. This diffuse reflection layer is prepared by employing the above diffuse reflection material, to allow this diffuse reflection layer to have a reflective index that still may be higher than 90%, at a thickness lower than 30 µm to 100 µm.

The above diffuse reflection layer can be prepared by employing an existing process. In one preferred embodiment of the present disclosure, a method for preparing the above diffuse reflection layer includes the following steps of: mixing the high reflection scattering particles with a whiteness greater than 90, high refraction scattering particles, and high thermal conductivity scattering particles as well as an adhesive agent and an organic carrier, to form a mixed material; and coating the mixed material onto a substrate surface and sintering to form a diffuse reflection layer. Preferably, the above coating step is carried out in a manner of blade coating, spin coating or screen printing, where preferably blade coating is employed. The blade coating manner is beneficial for improvement in the orientation of sheet-shaped scattering particles, improvement in the contact area among the particles, and thereby improvement in the heat diffusivity. Preferably, in the above sintering step according to the present disclosure, the diffuse reflection layer can be formed by sintering at 500° C. to 1000° C.

Organic carriers that may be used in the present disclosure include, but are not limited to, one of or a mixture of two or more of silicon oils of various systems such as phenyl silicon oil, methyl silicon oil and the like, ethanol, ethylene glycol, xylene, ethyl cellulose, acetyl tributyl citrate, terpineol, butyl carbitol, butyl carbitol acetate, PVA, PVB, PAA, and PEG. In the present disclosure, the organic carrier is preferably silicon oil or a mixed solution of ethyl cellulose+ terpineol+butyl carbitol acetate, and this organic carrier can be excluded by complete decomposition at 360° C. to 420° C., thereby to reduce the influence thereof on the diffuse reflection layer. However, an amount of the organic carrier can be determined according to when a suitable viscosity is achieved by formulating the ingredients, or alternatively, the amount can be adjusted appropriately according to different preparation processes. Regarding the blade coating, spin coating or screen printing process, the requirements for viscosity are varied, and for blade coating at present, a fraction by mass of the organic carrier ranges from 30% to 70%.

More preferably, the above step of coating the mixed material onto a substrate surface and sintering to form the diffuse reflection layer includes: coating the mixed material onto a substrate surface and sintering to form a first sub-diffuse reflection layer; coating the mixed material onto the first diffuse reflection layer and sintering to form a second sub-diffuse reflection layer; and repeating the coating and sintering steps, to form a plurality of sub-diffuse reflection layers, thereby to form the diffuse reflection layer. This manner in which a plurality of layers are coated and sintered is beneficial for improvement in the degree of orientation of rod-like or flat scattering particles, and improvement in the heat diffusivity thereof.

At the same time, the present disclosure further provides a wavelength conversion device. As shown in FIG. 1, this wavelength conversion device includes a high thermal conductivity substrate 1, a fluorescent layer 3 provided on the high thermal conductivity substrate 1 and including a back-light surface S1 and a photosensitive surface S2, and a diffuse reflection layer 2 located between the high thermal conductivity substrate 1 and the fluorescent layer 3, where the diffuse reflection layer 2 is prepared by employing the above diffuse reflection material. Through preparation of the diffuse reflection layer 2 by employing the above diffuse reflection material, and taking advantage of the above diffuse reflection layer, a higher diffuse reflective index can be maintained at a lower thickness, and both luminous efficiency and thermostability of the wavelength conversion device can be taken account of, to improve luminous stability of the wavelength conversion device when excited with a high power laser. More preferably, the diffuse reflection layer 2 in the above wavelength conversion device has a thickness of 30 µm to 100 µm, and a reflective index higher than 90%.

In addition, the present disclosure further provides a light source system, the light source system including the above wavelength conversion device. Through employment of the above wavelength conversion device, luminous stability of the light source system is improved. In practical applications, a projection system can take advantage of the above light source system, to allow the projection system to have enhanced luminous stability, and especially the luminous stability when excited with a high power laser.

Beneficial effects of the present disclosure will be further explained below in combination with examples and comparative examples.

I. Selections of Raw Materials Used in the Following Examples:

| | |
|---|---|
| aluminum oxide: | whiteness 98, commercially available from Shanghai Ultramicro Nano Technology Co., Ltd. |
| barium sulfate: | whiteness 98, commercially available from Foshan City Onmillion Nanomaterials Co., Ltd. |
| magnesium | whiteness 98, commercially available from Shanghai |

-continued

| | |
|---|---|
| oxide: | Ultramicro Nano Technology Co., Ltd. |
| calcium oxide: | whiteness 92, commercially available from Jiande City Aobanggai Articles Co., Ltd. |
| titanium dioxide: | rutile type, refractive index 2.7, commercially available from Shanghai Ultramicro Nano Technology Co., Ltd. |
| zirconium oxide: | refractive index 2.1, commercially available from Shanghai Ultramicro Nano Technology Co., Ltd. |
| zinc oxide: | refractive index 2.0, commercially available from Shanghai Ultramicro Nano Technology Co., Ltd. |
| lanthanum oxide: | refractive index 2.01, Ganzhou Kemingrui Non-ferrous Materials Co., Ltd. |
| boron nitride: | commercially available from Shanghai Ultramicro Nano Technology Co., Ltd. |
| aluminum nitride: | commercially available from Shanghai Ultramicro Nano Technology Co., Ltd. |

All of the above raw materials have a whiteness greater than 85.

The adhesive agent is borosilicate glass that has a $B_2O_3$ content of 10% to 20%, and a silicon oxide content of 70% to 90%. The silicate glass of boron is commercially available from Germany Schott Group.

Base materials: silicon nitride, silicon carbide, boron nitride, aluminum nitride, and beryllium oxide.

II. Examples and Data (1) Examples 1 to 5, Example 1', and Comparative Example 1

Example 1

Raw materials: 0.1 g of aluminum oxide (spherical, with a particle diameter of 0.2 μm), 0.6 g of titanium oxide (spherical, with a particle diameter of 0.2 μm), 0.4 g of boron nitride (flat, with a length in the flat direction of 0.7 μm, and a length in the thickness direction of 0.02 μm), and 1 g of glass powder.

Preparation method: aluminum oxide, titanium dioxide, and boron nitride as well as the glass powder and 1 g of organic carrier (which was terpineol, butyl carbitol acetate, ethyl cellulose) were mixed to form a mixed material; the mixed material was blade coated onto an aluminum nitride substrate surface and sintered at 800° C.; and the steps of blade coating and sintering were repeated to form a diffuse reflection layer with a thickness of 30 μm, which was determined to have a reflective index of 92.4%.

Example 2

Raw materials: 0.08 g of magnesium oxide (spherical, with a particle diameter of 0.3 μm), 0.7 g of zirconium oxide (spherical, with a particle diameter of 0.3 μm), 0.3 g of aluminum nitride (rod-like, with a length in the length direction of 1.0 μm, and a diameter length in the peripheral direction of 0.02 μm), and 1 g of glass powder.

Preparation method: the above magnesium oxide, zirconium oxide, and aluminum nitride as well as the glass powder and 1 g of organic carrier (which was a solution of PVA in water) were mixed to form a mixed material; the mixed material was blade coated onto a silicon nitride substrate surface and sintered at 600° C.; the steps of blade coating and sintering were repeated to form a diffuse reflection layer with a thickness of 30 μm, which was determined to have a reflective index of 90.8%.

Example 3

Raw materials: 0.08 g of barium sulfate (spherical, with a particle diameter of 0.5 μm), 0.5 g of zinc oxide (spherical, with a particle diameter of 0.5 μm), 0.3 g of aluminum nitride (flat, with a length in the flat direction of 2.5 μm, and a length in the thickness direction of 0.1 μm), and 1 g of glass powder.

Preparation method: the above barium sulfate, zinc oxide, and aluminum nitride as well as the glass powder and 2.5 g of organic carrier (which was formed by dissolving ethyl cellulose into a mixed solvent of terpineol and acetyl tributyl citrate) were mixed to form a mixed material; the mixed material was blade coated onto a boron nitride substrate surface and sintered at 1000° C.; and the steps of blade coating and sintering were repeated to form a diffuse reflection layer with a thickness of 30 μm, which was determined to have a reflective index of 91.3%.

Example 4

Raw materials: 0.15 g of aluminum oxide (spherical, with a particle diameter of 0.4 μm), 0.6 g of titanium oxide (spherical, with a particle diameter of 0.5 μm), 0.3 g of boron nitride (flat, with a length in the flat direction of 7 μm, and a length in the thickness direction of 0.25 μm), and 1 g of glass powder.

Preparation method: the above aluminum oxide, titanium oxide, and boron nitride as well as the glass powder and 5.4 g of organic carrier (which was formed by dissolving PVB into a mixed solvent of ethanol and ethylene glycol) were mixed to form a mixed material; the mixed material was blade coated onto a silicon carbide substrate surface and sintered at 900° C.; and the steps of blade coating and sintering were repeated to form a diffuse reflection layer with a thickness of 30 μm, which was determined to have a reflective index of 92.6%.

Example 5

Raw materials: 0.15 g of magnesium oxide (spherical, with a particle diameter of 0.6 μm), 0.5 g of titanium oxide (spherical, with a particle diameter of 0.2 μm), 0.45 g of aluminum nitride (rod-like, with a length in the length direction of 0.7 μm, and a diameter length in the peripheral direction of 0.05 μm), and 1 g of glass powder.

Preparation method: the above aluminum oxide, magnesium oxide, and boron nitride as well as the glass powder and 5.8 g of organic carrier (which was a solution of PVA in water) were mixed to form a mixed material; the mixed material was blade coated onto a beryllium oxide substrate surface and sintered at 500° C.; and the steps of blade coating and sintering were repeated to form a diffuse reflection layer with a thickness of 30 μm, which was determined to have a reflective index of 91.6%.

Example 1'

Raw materials: 0.1 g of calcium oxide (spherical, with a particle diameter of 0.5 μm), 0.6 g of lanthanum oxide (spherical, with a particle diameter of 0.2 μm), 0.4 g of boron nitride (rod-like, with a length in the length direction of 7 μm, and a diameter length in the peripheral direction of 0.25 μm), and 1 g of glass powder.

Preparation method: calcium oxide, lanthanum oxide, and boron nitride as well as the glass powder and 1 g of organic carrier (which was terpineol, butyl carbitol acetate, ethyl cellulose) were mixed to form a mixed material; the mixed material was blade coated onto an aluminum nitride substrate surface and sintered at 800° C.; and the steps of blade coating and sintering were repeated to form a diffuse reflection layer with a thickness of 30 μm, which was determined to have a reflective index of 90.2%.

Comparative Example 1

Raw material: 0.2 g of aluminum oxide (spherical, with a particle diameter of 0.25 μm), 1.0 g of titanium dioxide (spherical, with a particle diameter of 0.2 μm), and 1 g of glass powder.

Preparation method: aluminum oxide, and titanium dioxide, as well as the glass powder and 1 g of organic carrier (which was terpineol, butyl carbitol acetate, ethyl cellulose) were mixed to form a mixed material; the mixed material was blade coated onto an aluminum nitride substrate surface and sintered at 800° C.; and the steps of blade coating and sintering were repeated to form a diffuse reflection layer with a thickness of 30 μm, which was determined to have a reflective index of 92.9%.

Testing method: the prepared wavelength conversion devices in the above Examples were secured to a light spot of a laser source, emitted light was collected with an integrating sphere, and the emission spectra were detected with an optical fiber spectroscope.

Luminous flux of wavelength conversion devices: the spectrograph detected with the optical fiber spectroscope was recorded with a software, and then the luminous flux thereof was calculated.

The property of luminous efficiency of a wavelength conversion device was evaluated from the luminous flux of the wavelength conversion device subjected to excitation with a blue light laser at a certain power, and the thermostability thereof was judged by testing the linearity of luminous flux of the sample increasing with the power of the blue light.

Test results are shown in Table 1.

TABLE 1

Changes in luminous flux of different diffuse reflection layers as a function of laser current

| Laser drive current (A) | Luminous flux of wavelength conversion devices of different diffuse reflection layers (lm) | | | | | | |
|---|---|---|---|---|---|---|---|
| | Example 1 | Example 2 | Example 3 | Example 4 | Example 5 | Example 1' | Comparative Example 1 |
| 0.12 | 644 | 630 | 635 | 645 | 637 | 616 | 636 |
| 0.36 | 1925 | 1878 | 1887 | 1913 | 1895 | 1840 | 1905 |
| 0.6 | 3164 | 3090 | 3107 | 3151 | 3116 | 3035 | 3134 |
| 0.84 | 4306 | 4212 | 4236 | 4296 | 4250 | 4140 | 4273 |
| 1.08 | 5278 | 5175 | 5200 | 5275 | 5214 | 5075 | 5020 |
| 1.2 | 5581 | 5389 | 5401 | 5490 | 5401 | 5006 | 4758 |
| 1.3 | 5156 | 5204 | 5003 | 5300 | 5280 | Severe attenuation | Severe attenuation |

It can be seen from the above Examples 1 to 5 and Example 1' as well as the Comparative example 1 that, as compared with the reflective index of a diffuse emission layer prepared employing two types of scattering particles in the Comparative example 1, the reflective indexes of the diffuse reflection layer prepared in the present disclosure by employing high reflection scattering particles with a whiteness greater than 90, such as aluminum oxide, magnesium oxide, barium sulfate or calcium oxide; high refraction index particles, such as titanium oxide, zirconium oxide, zinc oxide or lanthanum oxide; and high thermal conductivity particles, such as boron nitride or aluminum nitride particles, as raw materials, were not changed significantly, or were all relatively higher. Therefore it can be known that the synergistic action between aluminum oxide (magnesium oxide or barium sulfate) and titanium oxide (zirconium oxide or zinc oxide) particles allows the prepared diffuse emission layer to be also able to realize a high reflective index at a lower thickness. In contrast, though the diffuse reflection layer formed by employing calcium oxide as the reflection particles and lanthanum oxide as the high refraction particles in combination with boron nitride has a relatively lower reflective index, the reflective index can also all achieve 90% or more.

Further, the present inventors prepared wavelength conversion devices from the diffuse emission layers prepared in Examples 1 to 5, 1' and Comparative example 1, and tested changes in the luminous flux of the wavelength conversion devices as a function of the laser current, at the same thickness of the diffuse reflection layer and the luminous layer in the prepared wavelength conversion devices.

It can be seen from data in the above Table 1 that, for wavelength conversion devices in Examples 1 to 5 and 1' formed by employing the diffuse emission layer prepared from the raw material according to the present disclosure, when the laser drive current was within a range from 0.12 A to 1.2 A, luminous fluxes of the wavelength conversion device gradually increased with the increase in the drive current, and had relatively higher enhancement amplitude in various Examples. However, when the drive current was higher than 1.08 A, the luminous fluxes in Examples 1 to 5 still exhibited a rising tendency, but the luminous fluxes in Example 1' and Comparative example 1 began to decrease gradually, but the decrease amplitude in Example 1' was relatively lower. When the drive current was higher than 1.2 A, the luminous fluxes in Example 1' and Comparative example 1 were attenuated severely, but Examples 1 to 5 could still maintain higher luminous fluxes. It can be seen that, the strong heat conduction effect of high thermal conductivity boron nitride/aluminum nitride particles for the diffuse reflection layer allows the critical drive laser current of the wavelength conversion devices to become higher, which contributes to the improvement in brightness. Therefore, the synergistic action among various components in the diffuse reflection material according to the present disclosure allows the diffuse reflection layer to prepare to not only have a higher reflective index, but also achieve an unexpected technical effect in thermostability, and at a drive current intensity as high as 1.3 A, the brightness of a light emitting device can be further improved.

(II) Examples 6 to 34

The relationship between the reflective index and powder adhesion of a diffuse reflection layer was analyzed, by preparing the diffuse reflection layer with boron nitride (sheet-shaped), titanium dioxide (spherical) and aluminum oxide (spherical) as raw materials, and through changing the amounts and particle diameters of the raw materials used, as well as the thickness of the diffuse reflection layer.

Particle diameter ranges and parts of the raw materials are as shown in Table 2.

Preparation method: boron nitride, titanium dioxide, aluminum oxide and a glass powder were mixed with 0.5 g to 5.4 g of an organic carrier (which was formed by dissolving ethyl cellulose into a mixed solvent of terpineol, butyl carbitol, butyl carbitol acetate, and acetyl tributyl citrate) to form a mixed material, and the mixed material was blade coated onto a ceramic substrate surface and sintered at 800° C. so as to form a diffuse reflection layer.

Properties of the diffuse reflection layers of various examples were subjected to the following Test I, with results thereof shown in Table 2.

Adhesion properties of the powder: an adhesive tape was adhered to the diffuse reflection layer, then peeled off, and adhesion properties of the powder were judged through observing whether there was a powder remained on the adhesive tape. Good adhesion refers to a fact that there is no powder remaining on the adhesive tape, and poor adhesion refers to a fact that there is powder remaining on the adhesive tape.

Reflective index: a barium sulfate diffuse reflection whiteboard was used as a standard, and the diffuse reflection luminous power of the sample was subjected to comparison tests with an integrating sphere.

rial boron nitride or employing two raw materials boron nitride and aluminum oxide have relatively lower reflective indexes, lower than 90%, whereas the diffuse emission layers prepared by employing the above three raw materials according to the present disclosure have reflective indexes all higher than 90% at the same thickness.

In particular, it can be seen from data of Examples 6 to 9 that, when boron nitride (with a length in the sheet direction from 5 μm to 7 μm) is added in an amount from 0.25 part up to 0.4 part, the reflective index thereof increases from 76% up to 87%. However, because particles thereof are sheet-shaped, the amount of boron nitride added into the glass powder should not be too high. It can be further seen that, when boron nitride (from 5 μm to 7 μm) is added in an amount from 0.25 part up to 0.3, to 0.4 part, the adhesion property thereof on a substrate is increasingly worse, and further increase in the boron nitride content will lead to a drylining phenomenon of boron nitride (with a length in the sheet direction from 5 μm to 7 μm). Such as with Example 9, this is the same case with boron nitride having a smaller particle diameter (with a length in the sheet direction of 0.7 μm), because sheet-shaped particles can easily form a card-bridged structure to exert a mutual supporting effect and hinder the material contraction. Therefore, in the above examples of the present disclosure, the defects that the sheet-shaped scattering particles are difficult to form a dense structure with glass, and sintering stress in the length direction is not consistent with that in the thickness direction, leading to lower adhesion strength after sintering, is avoided by controlling the boron nitride content within a specific range.

TABLE 2

| Example No. | Thickness of diffuse reflection layer (μm) | 5 μm to 7 μm boron nitride/g | 0.7 μm boron nitride/g | 0.2 μm to 0.5 μm aluminum oxide/g | 0.2 μm $TiO_2$/g | 0.5 μm $TiO_2$/g | glass powder/g | reflective index % |
|---|---|---|---|---|---|---|---|---|
| 6  | 42-48   | 0.25 | /   | /    | /   | /   | 1 | 75.8 |
| 7  | 49-52   | 0.3  | /   | /    | /   | /   | 1 | 81.1 |
| 8  | 30-40   | 0.4  | /   | /    | /   | /   | 1 | 87.2 |
| 9  | 30-35   | /    | 0.4 | /    | /   | /   | 1 | 85.5 |
| 10 | 46-50   | /    | 0.4 | /    | /   | /   | 1 | 87.2 |
| 11 | 45-50   | 0.4  | /   | 0.08 | /   | /   | 1 | 88.3 |
| 12 | 40-46   | 0.4  | /   | 0.1  | /   | /   | 1 | 89.3 |
| 13 | 56-60   | 0.4  | /   | 0.1  | /   | /   | 1 | 90.4 |
| 14 | 30-40   | 0.4  | /   | 0.2  | /   | /   | 1 | 89.6 |
| 15 | 36-38   | 0.3  | /   | 0.1  | /   | 0.5 | 1 | 90.5 |
| 16 | 33-35   | 0.4  | /   | 0.1  | /   | 0.6 | 1 | 92.6 |
| 17 | 58-59   | 0.4  | /   | 0.1  | /   | 0.6 | 1 | 94.7 |
| 18 | 85-89   | 0.4  | /   | 0.1  | /   | 0.6 | 1 | 94.9 |
| 19 | 37-38   | 0.5  | /   | 0.1  | /   | 0.6 | 1 | 92.9 |
| 20 | 35-38   | 0.5  | /   | 0.2  | /   | 0.6 | 1 | 93.5 |
| 21 | 36-39   | 0.4  | /   | 0.1  | /   | 0.8 | 1 | 91.9 |
| 22 | 34-36   | 0.4  | /   | 0.1  | 0.5 | /   | 1 | 94.9 |
| 23 | 65-68   | 0.4  | /   | 0.1  | 0.5 | /   | 1 | 96.1 |
| 24 | 95      | 0.4  | /   | 0.1  | 0.5 | /   | 1 | 96.7 |
| 25 | 35-40   | 0.4  | /   | 0.1  | 0.6 | /   | 1 | 94.4 |
| 26 | 72-76   | 0.4  | /   | 0.1  | 0.6 | /   | 1 | 95.5 |
| 27 | 98-102  | 0.4  | /   | 0.1  | 0.6 | /   | 1 | 94.9 |
| 28 | 37-38   | 0.5  | /   | 0.1  | 0.5 | /   | 1 | 94.3 |
| 29 | 74-79   | 0.5  | /   | 0.1  | 0.5 | /   | 1 | 95.4 |
| 30 | 98-103  | 0.5  | /   | 0.1  | 0.5 | /   | 1 | 96.3 |
| 31 | 37-39   | 0.5  | /   | 0.15 | 0.5 | /   | 1 | 94.3 |
| 32 | 58-66   | 0.5  | /   | 0.15 | 0.5 | /   | 1 | 95.7 |
| 33 | 79-96   | 0.5  | /   | 0.15 | 0.5 | /   | 1 | 96.8 |
| 34 | 43-46   | 0.5  | /   | 0.2  | 0.5 | /   | 1 | 94.2 |

It can be seen from Table 2 that, in Examples 6 to 14 as comparative examples of Examples 15 to 34, the diffuse reflection layers prepared by employing a single raw mate- Further, it can be seen from Examples 6 to 14 in Table 2 that, under the circumstance where a single raw material is employed or only two raw materials are employed, the reflective indexes of a diffuse reflection layer formed by sintering boron nitride and glass powder, and a diffuse emission layer formed by sintering boron nitride and aluminum oxide mixed particles with glass powder, are strongly dependent on the thickness. That is to say, at a lower thickness, the reflective index is low, for example, when the thickness is lower than 52 μm, the reflective index is less than 90%. However, in Examples 15 to 34 employing raw materials according to the present disclosure, when titanium dioxide was added, the reflective index of a diffuse emission layer prepared was significantly less dependent on the thickness due to the synergistic action between titanium dioxide and, aluminum oxide and boron nitride. When the thickness was decreased from 90 μm down to 30 μm, the reflective index did not decrease significantly, and when the thickness was as low as <50 μm, an unexpected effect of a reflective index higher than 90% was also achieved.

Further, the addition of small-particle diameter spherical aluminum oxide particles or titanium dioxides can improve the adhesion property of sheet-shaped boron nitride particles in a glass powder. For example, 0.4 part of boron nitride alone as shown in Example 8 could not realize good adhesion. The adhesion property of the diffuse reflection layer formed by employing 0.4 part by mass of boron nitride and 0.2 part by mass of aluminum oxide in Example 14 was not good either, and when greater than 0.7 part by weight of titanium dioxide was employed in Examples 20 and 21, the adhesion property was also relatively poor. However, it can be seen from Examples 15 to 18, 22, 25, 28 and Example 31 that, the addition of 0.1 part to 0.15 part of aluminum oxide and 0.5 part to 0.6 part of titanium dioxide powder into 0.4 part to 0.5 part by mass of a boron nitride powder not only can achieve good adhesion with a ceramic substrate and adhesion stability, but also can achieve a higher reflective index, and at the same time, the reflective index is less dependent on the thickness, so as to still maintain a higher reflective index at a lower thickness.

Furthermore, it can be seen through comparison of data of Examples 11 to 14 and 8 in Table 2 that, when a small amount of aluminum oxide is added into boron nitride, the reflective index will be improved significantly, which embodies the effect of high reflection particles of aluminum oxide. Further, it can be seen through comparison of data of Examples 6 to 14 and Examples 15 to 34 in Table 2 that, the addition of spherical aluminum oxide and spherical titanium dioxide can improve the adhesion property of boron nitride, which is mainly because that small-particle diameter spherical aluminum oxide and titanium dioxide can improve flowability of the glass powder in the molten state, thereby to improve adhesion property thereof, thereby to allow the prepared wavelength conversion device to have higher thermostability.

Test II

Taking Comparative example 1, Examples 16, 21, 20, 25 and 34 as examples, a wavelength conversion device was fabricated. At the same thickness of the diffuse reflection layer (with a thickness of 30 μm to 40 μm) and the luminous layer, changes in luminous flux of the wavelength conversion device as a function of the laser current were tested, where test results of the luminous flux of the wavelength conversion device are as shown in Table 3.

It can be seen from the data in Table 3 that, at the same thickness of the diffuse reflection layer (with a thickness of 30 μm to 40 μm) and the luminous layer in the wavelength conversion device, when boron nitride is added into aluminum oxide and titanium dioxide, the wavelength conversion device fabricated thereby has a significantly enhanced luminous intensity when excited with a high power laser. Therefore it can be known that, the addition of the boron nitride raw material enables synergistic action among the three substances, to allow the diffuse reflection layer prepared to have a significantly enhanced heat diffusivity, thereby enhancing the luminous intensity of the wavelength conversion device when excited with a high power laser.

TABLE 3

Change in luminous flux of different diffuse reflection layers as a function of laser current

| Laser drive current (A) | Luminous flux of wavelength conversion devices of different diffuse reflection layers (lumina) | | | | | |
| --- | --- | --- | --- | --- | --- | --- |
| | Comparative Exampe 1 | Example 16 | Example 20 | Example 21 | Example 25 | Example 34 |
| 0.12 | 636 | 644 | 648 | 637 | 652 | 651 |
| 0.36 | 1905 | 1925 | 1931 | 1901 | 1948 | 1935 |
| 0.6 | 3134 | 3164 | 3046 | 3007 | 3210 | 3104 |
| 0.84 | 4273 | 4306 | 3900 | 4130 | 4380 | 3946 |
| 1.08 | 5020 | 5278 | 3105 | 3585 | 5378 | 3213 |
| 1.2 | 4758 | 5581 | Severe attenuation | Severe attenuation | 5700 | Severe attenuation |
| 1.3 | Severe attenuation | 5056 | / | / | 5680 | / |

Further, it can be seen in combination with the data in Tables 2 and 3, and through comparing Examples 12 with 14, 19 with 20, and 33 with 34 that, though improvement in the aluminum oxide content is beneficial for improvement in the reflective index, an excessively high content of aluminum oxide, for example, an aluminum oxide content as high as 0.2, will lead to a poor sintered density of the diffuse reflection layer. As shown in Examples 20 and 34 of Table 3, with the increase in laser current, the luminous flux 1.2 A suffers from severe attenuation, which is because that, as an intermediate for the glass network, in the sintering process of the glass powder, it will increase the viscosity of glass at enhanced temperature in the molten state, which is unfavorable to the sintering densification. Therefore, in the presence of boron nitride and titanium oxide, the content of aluminum oxide should not exceed 0.15 part. At the same time, it can be seen through comparison of Examples 16, 19, 20, and 21 that, though improvement in the titanium oxide content is beneficial for reduction in thickness of the high reflective index diffuse reflection layer, as well as for improvement in the sintered density, an excessively high content of titanium oxide will lead to an excessively high content of diffuse reflection particles, and is not beneficial for sintering. Therefore, with respect to the parts by mass of the glass powder, if the parts by mass of titanium oxide exceeds 0.7, for example, as shown in Example 21 of Table 3, when the parts by mass of titanium oxide achieve 0.8, as the laser current increases, when the drive current achieves 1.2 A, the luminous flux will suffers from severe attenuation, and also the ratio by weight of the diffuse reflection particles to the adhesive agent should not exceed 1.15:1.

It can be seen from the above data that, in the present disclosure, directing towards the problem that relatively thicker diffuse reflection layers of current wavelength conversion devices lead to a lower heat diffusivity, and thereby influence the luminous stability thereof when excited with a laser at a high power density, the heat diffusivity of the whole diffuse reflection layer is improved through the addition of boron nitride scattering particles in which sheet-shaped boron nitride has a higher heat diffusivity and the sheet structure is beneficial for the formation of thermally conductive networks by mutual overlapping among the particles. At the same time, directing towards the problem that the sheet-shaped scattering particles and glass powder are difficult to be sintered to dense, spherical scattering particles are selected to contribute to the improvement in flowability of the glass powder in the molten state. Further, because the spherical scattering particles have a relatively identical curvature radius in various directions, the sintering stress in various directions is close in magnitude to that of the glass powder, to easily improve the adhesion strength after sintering, thereby to improve sintered density with the scattering particles. Further, biased selection of spherical scattering particles titanium dioxide that has a smaller influence on the flowability of glass powder in high temperature sintering is carried out, and a proportion by mass of the spherical scattering particles to the sheet-shaped scattering particles is no greater than 2.25:1, and if the proportion by mass is too high, it will fail to achieve an ideal effect of heat dissipation. Further, the selection of high refractive index scattering particle titanium dioxide can reduce optical lengths of scattering and refraction light paths, to reduce absorption. Therefore, a higher reflective index can be achieved at a relatively lower thickness, and the lower thickness further reduces the thermal resistance. Therefore, a composite diffuse reflection layer of sheet-shaped boron nitride, spherical aluminum oxide and titanium dioxide can achieve a higher reflective index and a lower thermal resistance at a lower thickness, thereby to contribute to the improvement in luminous stability of the whole wavelength conversion device when excited with a laser at a high power density.

The above are only preferred examples of the present disclosure, and are not intended to limit the present disclosure. Various modifications and changes may be made to the present disclosure for a person of skill in the art. Any amendments, equivalent replacements, improvements and the like made within the spirit and principle of the present disclosure shall be all comprehended within the protection scope of the present disclosure.

The invention claimed is:

1. A diffuse reflection material, comprising white scattering particles and an adhesive agent, wherein the whiteness of the white scattering particles is greater than 85 and the white scattering particles comprise high reflection scattering particles with a whiteness of greater than 90, high refraction scattering particles with a refractive index of greater than or equal to 2.0, and high thermal conductivity scattering particles, wherein the high thermal conductivity scattering particles are boron nitride and/or aluminum nitride, and the particle shape of the high thermal conductivity scattering particles is rod-like or flat.

2. The diffuse reflection material according to claim 1, wherein the white scattering particles comprise, based on parts by weight, 0.08 part to 0.15 part of high reflection scattering particles with a whiteness greater than 90, 0.5 part to 0.7 part of high refraction scattering particles, and 0.3 part to 0.5 part of the high thermal conductivity scattering particles.

3. The diffuse reflection material according to claim 1, wherein a ratio by weight of the white scattering particles to the adhesive agent is from 0.88 to 1.15 : 1.

4. The diffuse reflection material according to claim 1, wherein the high reflection scattering particles with a whiteness greater than 90 and the high refraction scattering particles are spherical in shape; and the high reflection scattering particles with a whiteness greater than 90 and the high refraction scattering particles have a radius from 0.2 μm to 0.5 μm.

5. The diffuse reflection material according to claim 1, wherein,
the high reflection scattering particles with a whiteness greater than 90 are one or more of aluminum oxide, magnesium oxide and barium sulfate;
the high refraction scattering particles are one or more of titanium dioxide, zirconium oxide and zinc oxide; and
when the high thermal conductivity scattering particles are flat, the high thermal conductivity scattering particles have a length in the flat direction of 0.7 μm to 7 μm and a length in the thickness direction of 0.02 μm to 0.25 μm; and
when the high thermal conductivity scattering particles are rod-like, the high thermal conductivity scattering particles have a length in the length direction of 0.7 μm to 7 μm and a length in the peripheral direction of 0.02 μm to 0.25 μm.

6. A diffuse reflection layer, wherein the diffuse reflection layer is prepared by employing the diffuse reflection material of claim 1.

7. A method for preparing a diffuse reflection layer, the method comprising steps of:
mixing the diffuse reflection material of claim 1 with an organic carrier to form a mixed material; and
coating the mixed material onto a substrate surface and sintering to form the diffuse reflection layer.

8. The preparation method according to claim 7, wherein in the step of coating the mixed material onto a substrate surface, the coating is carried out in a manner of blade coating, spin coating, or screen printing.

9. The preparation method according to claim 8, wherein the step of coating the mixed material onto a substrate surface and sintering to form the diffuse reflection layer comprises:
coating the mixed material onto a substrate surface and sintering to form a first sub-diffuse reflection layer;
coating the mixed material onto a surface of the first sub-diffuse reflection layer and sintering to form a second sub-diffuse reflection layer; and
repeating the coating and sintering steps to form a plurality of sub-diffuse reflection layers, thereby to form the diffuse reflection layer.

10. A wavelength conversion device, comprising a high thermal conductivity substrate, a fluorescent layer provided on the high thermal conductivity substrate, and a diffuse reflection layer located between the high thermal conductivity substrate and the fluorescent layer, wherein the diffuse reflection layer is a diffuse reflection layer according to claim 6.

11. The wavelength conversion device according to claim 10, wherein the diffuse reflection layer has a thickness of 30 μm to 100 μm, and a reflective index higher than 90%.

12. A light source system, comprising a wavelength conversion device, wherein the wavelength conversion device is a wavelength conversion device according to claim 10.

13. The diffuse reflection layer according to claim 6, wherein the white scattering particles comprise, based on parts by weight, 0.08 part to 0.15 part of high reflection scattering particles with a whiteness greater than 90, 0.5 part to 0.7 part of high refraction scattering particles, and 0.3 part to 0.5 part of the high thermal conductivity scattering particles.

14. The diffuse reflection layer according to claim 6, wherein a ratio by weight of the white scattering particles to the adhesive agent is from 0.88 to 1.15:1.

15. The diffuse reflection layer according to claim 6, wherein the high reflection scattering particles with a whiteness greater than 90 and the high refraction scattering particles are spherical in shape; and the high reflection scattering particles with a whiteness greater than 90 and the high refraction scattering particles have a radius from 0.2 μm to 0.5 μm.

16. The diffuse reflection layer according to claim 6, wherein,
the high reflection scattering particles with a whiteness greater than 90 are one or more of aluminum oxide, magnesium oxide, and barium sulfate;
the high refraction scattering particles are one or more of titanium dioxide, zirconium oxide, and zinc oxide; and
when the high thermal conductivity scattering particles are flat, the high thermal conductivity scattering particles have a length in the flat direction of 0.7 μm to 7 μm and a length in the thickness direction of 0.02 μm to 0.25 μm; and
when the high thermal conductivity scattering particles are rod-like, the high thermal conductivity scattering particles have a length in the length direction of 0.7 μm to 7 μm and a length in the peripheral direction of 0.02 μm to 0.25 μm.

17. The wavelength conversion device according to claim 10, wherein the white scattering particles comprise, based on parts by weight, 0.08 part to 0.15 part of high reflection scattering particles with a whiteness greater than 90, 0.5 part to 0.7 part of high refraction scattering particles, and 0.3 part to 0.5 part of the high thermal conductivity scattering particles.

18. The wavelength conversion device according to claim 10, wherein a ratio by weight of the white scattering particles to the adhesive agent is from 0.88 to 1.15:1.

19. The wavelength conversion device according to claim 10, wherein the high reflection scattering particles with a whiteness greater than 90 and the high refraction scattering particles are spherical in shape; and the high reflection scattering particles with a whiteness greater than 90 and the high refraction scattering particles have a radius from 0.2 μm to 0.5 μm.

20. The wavelength conversion device according to claim 10, wherein,
the high reflection scattering particles with a whiteness greater than 90 are one or more of aluminum oxide, magnesium oxide and barium sulfate;
the high refraction scattering particles are one or more of titanium dioxide, zirconium oxide and zinc oxide; and
when the high thermal conductivity scattering particles are flat, the high thermal conductivity scattering particles have a length in the flat direction of 0.7 μm to 7 μm and a length in the thickness direction of 0.02 μm to 0.25 μm; and
when the high thermal conductivity scattering particles are rod-like, the high thermal conductivity scattering particles have a length in the length direction of 0.7 μm to 7 μm and a length in the peripheral direction of 0.02 μm to 0.25 μm.

* * * * *